Oct. 18, 1966  R. W. BLAIR  3,279,804
END FACE SEAL ASSEMBLY
Filed July 5, 1963
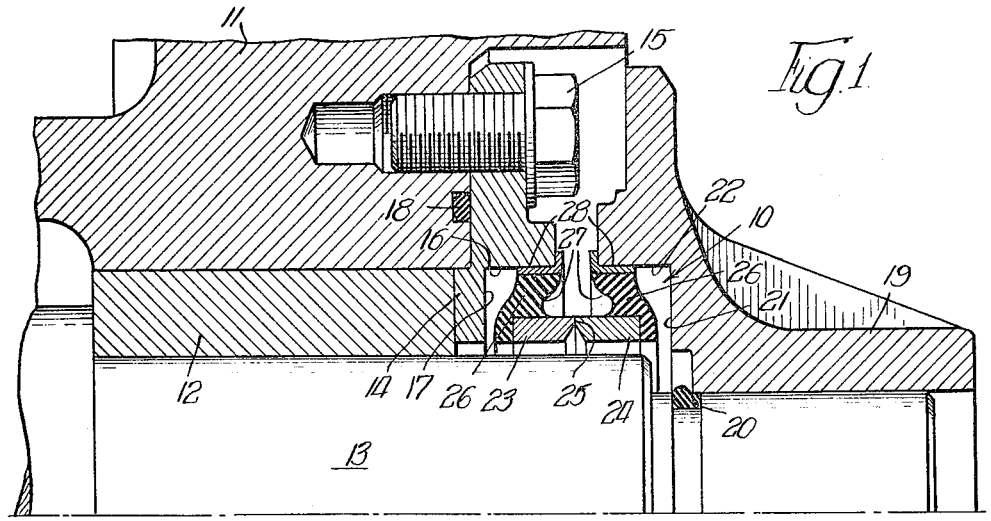
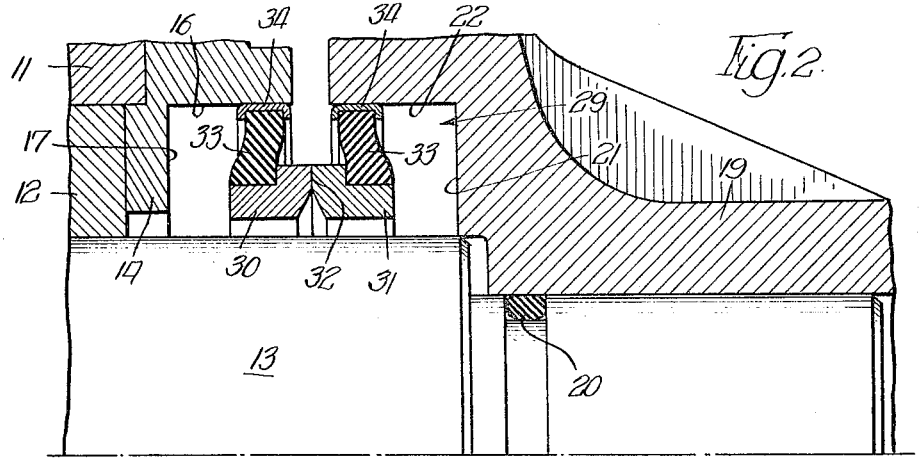
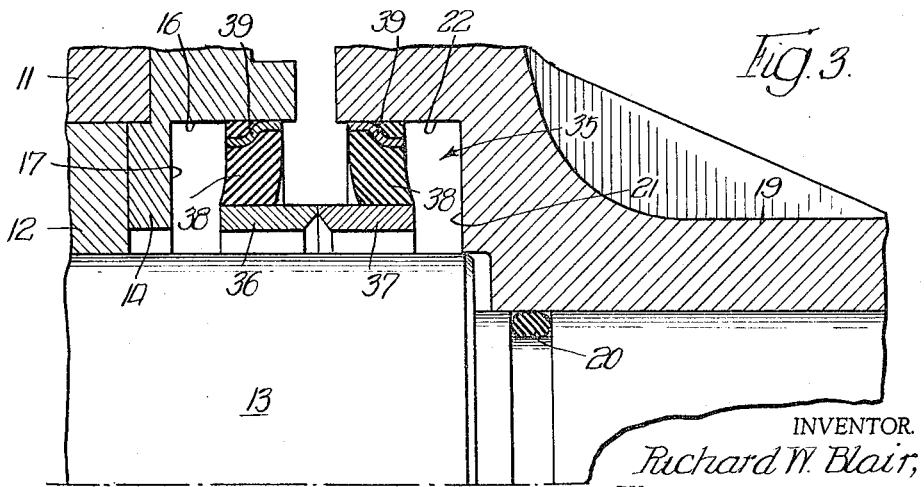
INVENTOR.
Richard W. Blair,
BY
Strist, Lockwood, Greenawalt & Dewey.
Atty's

United States Patent Office 3,279,804
Patented Oct. 18, 1966

3,279,804
END FACE SEAL ASSEMBLY
Richard W. Blair, Arlington Heights, Ill., assignor to Chicago Rawhide Manufacturing Co., Chicago, Ill., a corporation of Illinois
Filed July 5, 1963, Ser. No. 293,017
5 Claims. (Cl. 277—92)

The invention is directed to a new and improved form of end face seal assembly of the rotary type, the assembly basically comprising at least one sealing ring having fixed thereto a radially projecting resilient combination secondary sealing and spring member arranged for fixing relative to a part of an installation receiving the seal assembly and providing gasketing action for the sealing ring as well as an axial force component to maintain the sealing ring in running face sealing engagement with a mating surface. An important aspect of the invention resides in the positioning of the secondary member to place the same in tension type shear in the installed condition of the seal assembly thus utilizing the tendency of the secondary member to return to its initial relaxed condition in providing at least the axial force component necessary for the maintaining of a running end face seal.

It is an object of the invention to provide a new and improved form of end face seal assembly of uncomplicated construction capable of ready fabrication and installation and utilizing a resilient rubber-like part which is tensioned in shear in the installed condition of the seal assembly to maintain and axial force establishing a running end face sealing action.

Another object is to provide special unique forms of end face seals consisting basically of a sealing ring and gasket member with the latter so arranged to be tensioned in the installed condition to provide an axial force component capable of maintaining the sealing ring in running end face sealing engagement with a mating surface.

Other objects not specifically set forth will become apparent in the following detailed description of the invention made in conjunction with the accompanying drawings wherein:

FIG. 1 is a fragmentary half section of a track roller installation illustrating one form of end face seal assembly of the invention in its installed position just immediately prior to complete final assembly of the installation;

FIG. 2 is a fragmentary half section of a track roller installation in the fully assembled condition utilizing another form of end face seal assembly of the invention; and FIG. 3 is a view similar to FIG. 2 illustrating the use of still another form of end face seal assembly of the invention.

FIG. 1 illustrates a typical track roller installation including a "mirror image" form of seal assembly of the invention, this form being identified by the numeral 10. The installation includes a track roller 11 mounted on a main bearing 12 for rotation about a shaft 13. A thrust plate 14 is fixed to the roller 11 by a plurality of fasteners 15 and engages the outer end of the main bearing 12. The thrust plate 14 is formed with an outer end surface annular recess defined by a radial surface 16 and an axial surface 17 which are joined at right angles. A suitable O-ring unit 18 forms a seal between the thrust plate and the track roller 11. The basic track roller installation is completed as shown in FIG. 1 by a track shaft cap 19 which is suitably fixed on the roller shaft 13 and which is axially movable outwardly therealong for seal assembly installation. The cap 19 includes suitable fastener means (not shown) to fix the same on the shaft 13. An O-ring sealing unit 20 is located between the outer reduced end of the shaft 13 and the cap 19. This cap includes an inwardly opening annular recess portion defined by a radial wall surface 21 joined with an axial wall surface 22 in right angle relation. The seal assembly 10 is mounted about the shaft 13 in spaced relation therewith and is engaged between the thrust plate 14 and cap 19 in the final installed condition thereof. As illustrated in FIG. 1, the cap 19 is not fully installed but is in the final process of complete installation and requires merely to be drawn in closer toward the thrust plate 14 into the final position illustrated in FIG. 2.

The seal assembly 10 comprises a pair of cooperating sealing rings 23 and 24 having inner diameters greater than the diameter of the shaft 13. The rings 23 and 24 are of the same design and each may be considered a sealing ring or one may be considered the sealing ring and the other the mating ring or member. The rings 23 and 24 each includes an end face annular sealing surface 25 and the rings are in the form of relatively flat annular bands.

The seal assembly 10 is completed by the provision of a combination secondary sealing and spring member 26 extending between the rear portions of each sealing ring 23 and 24 into engagement with the thrust plate 14 and cap 19. Each secondary member is formed from solid-rubber-like resilient material to permit movement of the sealing ring to which it is attached relative to the outer projecting end portion of the secondary member. Each secondary member 26 includes an inner end portion fixed to adjacent radial and axial surface areas of a corresponding sealing ring located rearwardly of the sealing face 25 thereof. The inner end of peripheral portions of the secondary members are suitably bonded or adhered to the material of the sealing rings and the areas of engagement are rather substantial so that a good bond or adherence is maintained to permit the secondary members to be substantially tensioned in the installed condition of the seal assembly.

Each secondary member 26 includes along the front face thereof a molded recess area 27 providing a somewhat necked-down intermediate portion thereto to permit ready flexing and tensioning of the secondary member during rearward axial movement of the sealing ring attached thereto upon installation of the seal assembly. The outer end or peripheral portion of each secondary member is suitably attached to a relatively rigid mounting means which is in the form of an annular L-shaped stamping 28. The stamping 28 associated through the secondary member of the sealing ring 23 is frictionally fixedly mounted in the thrust plate recess along the axial surface 16 and overlapping the outer end portion thereof. The remaining stamping 28 is similarly frictionally fixed along the axial surface 22 of the cap 19 and in this manner each secondary member 26 is suitably sealed relative to a part of the installation.

In the installed condition of the assembly 10, the secondary members 26 actually are deformed to a somewhat reversed position relative to their respective sealing rings 23 and 24. The seal assembly portion including the sealing ring 23 is first installed in the thrust plate 14 and the remaining seal assembly portion including the sealing ring 24 is readily installed in the cap 19. Upon axial advancement of the cap 19 along the shaft 13, the end surfaces 25 of the sealing rings will abut and the sealing rings will be moved axially rearwardly relative to and coaxially within the respective stamping 28. In this manner the diaphragm-type secondary members 26 are placed in tension and shear with the sealing rings being provided with an axial force component adequate to establish and maintain a requisite face load for running end face sealing action. The tensioned secondary members 26 are deformed along planes which are diagonally directed toward the rear portions of the respective sealing rings 23 and 24. In this manner internal gasketing is established in an uncomplicated manner and adequate face loading is provided. The "mirror image" arrangement of the seal assembly permits economical manufacture and self-balancing functioning of the assembly during use. While the "mirror image" arrangement has been described, it will be understood that a single unit including a single sealing ring and secondary member can be advantageously used in conjunction with a suitable mating surface supplied by some other component of the installation.

FIG. 2 illustrates a modified seal assembly 29 mounted in the same track roller installation with the installation being illustrated in its fully closed condition. In this respect the cap 19 is fully drawn inwardly along the shaft with the secondary members of the seal assembly 29 being subjected to full tensional distortion. The seal assembly 29 includes generally L-shaped sealing rings 30 and 31 placed in end face engagement along abutting sealing surfaces 32. Each sealing ring has fixed thereto the inner end portion of an annular resilient combination secondary sealing and spring member 33 which extends radially outwardly from the respective sealing ring and is fixed at the outer end portion thereof to a generally U-shaped annular stamping 34 frictionally fixed to the thrust plate 14 or cap 19.

The inner end or peripheral portion of each secondary member 33 is of block-like configuration and is suitably bonded or adhered in fixed relation to rearwardly exposed radial and axial surface portions of a sealing ring. In this respect each secondary member substantially engages a sealing ring over an appreciable area to prevent separation therefrom during operational use. The outer end or peripheral portion of each secondary member is suitably fixed within the associated stamping 34 and is preferably bonded thereto to prevent separation. In the installed condition of the seal assembly each secondary member 33 is portionally distorted by reason of the associated sealing ring being moved axially rearwardly relative to the stamping by balanced contact with the engaging sealing ring. The secondary member 33 is in substantially a normal relation relative to the longitudinal axis of the seal assembly but is adequately distorted under tension to provide the sealing ring with an axial face loading force component. The thicker type of secondary sealing member 33 as compared to the configuration of secondary sealing member of the seal assembly 10 permits higher face loading in a more limited seal mounting area. Here again, an individual sealing ring including a secondary member 33 and stamping 34 may be used in end face sealing engagement with any suitable mating surface forming a part of the installation.

FIG. 3 illustrates still another form of seal assembly 35 including a pair of band-type sealing rings 36 and 37 each having suitably fixed thereto along a rear axial surface portion thereof a generally block-like annular secondary member 38 which is also formed from resistant material and is placed in shear in the installed condition of the seal assembly as illustrated. Each sealing member 38 in the relaxed condition of the seal assembly is generally rectangular in cross section and is relatively thick in an axial direction to provide for substantial area bonding with the outer axial surface of the associated sealing ring. The outer end or peripheral portion of each secondary member 38 has embedded therein a generally S-shaped stamping 39 having a portion thereof exposed for frictional engagement with appropriate surface areas of either the thrust plate 14 or cap 19. Each stamping is only partially engaged with a surface of the installation part and a portion of the secondary member is frictionally in engagement therewith to provide an additional gasketing effect. The seal assembly of FIG. 3 is also readily adapted for limited space installation and provides a rather substantial face loading force. Here again, a single ring and attached secondary member can be suitably operatively mounted in running end face engagement with a mating surface of the installation.

The rigidifying means in the form of attached or embedded stampings permit anchoring of the secondary sealing members to the installation part for stretching thereof in tension for sealing ring face loading while retaining the secondary sealing or internal gasketing effect. While all of the modifications illustrated include secondary members extending radially outwardly from the respective sealing rings, it will be understood that such secondary members can also extend radially inwardly depending upon the form of installation with which the seal assembly is to be used. The overlying fixing of the projecting end portions of the secondary members relative to the sealing rings in coaxial relation therewith permit seal balancing which is further enhanced by the axial face loading function of the secondary members. Seal mounting space requirements are maintained at a minimum and the seal assemblies can be readily fabricated and installed.

Obviously certain modifications and variations of the invention as hereinbefore set forth may be made without departing from the spirit and scope thereof, and therefore only such limitations should be imposed as are indicated in the appended claims.

I claim:

1. An end face seal assembly comprising: a sealing ring including a sealing face, and a combination secondary sealing and spring member engaging said sealing ring rearwardly of the sealing face thereof, said secondary member being of annular and generally rectangular configuration having a first marginal portion thereof fixed to said sealing ring and a second marginal portion positioned in radially spaced relation from said sealing ring for fixed mounting on a part of an installation with which said seal assembly is adapted for use, said secondary member being formed from rubber-like resilient material for axial rearward movement of said sealing ring relative to said second marginal portion, said secondary member projecting substantially and radially from said sealing ring in a direction prior to installation of said seal assembly to be normal to the longitudinal axis of said seal assembly, whereby said secondary member is placed in tension upon installation of said seal assembly and axial rearward movement of said sealing ring relative thereto.

2. The seal assembly of claim 1 wherein said second marginal portion of said secondary member includes relatively rigid mounting means fixed thereto to retain the annular configuration of said marginal portion upon tensional distortion of said secondary member in the installed condition thereof.

3. In an installation including parts mounted coaxially for relative rotation, the provision of an end face running seal assembly operatively mounted on one of said parts and comprising a sealing ring having a sealing face in running engagement with a mating surface carried by another of said parts, and a combination secondary sealing and spring member engaging said sealing ring rearwardly of said sealing face and engaging said one part, said secondary member being of annular and generally rectangular configuration with a first marginal portion fixed to said sealing ring and a second marginal portion positioned substantially radially away from said sealing ring in fixed engagement with said one part, said secondary member being formed from rubber-like resilient material and extending radially relative to said sealing ring with said sealing ring moved axially rearwardly relative to said second marginal portion of said secondary member, whereby said secondary member is distorted in tension and positioned relative to said sealing ring to hold the same in axial sealing engagement with said mating surface.

4. The seal assembly of claim 3 wherein said second marginal portion of said secondary member includes relatively rigid mounting means fixed thereto to retain the annular configuration of said marginal portion upon tensional distortion of said secondary member in the installed condition thereof.

5. The installation of claim 3 wherein said mating surface is defined by another seal assembly which is the mirror image of the seal assembly first named.

References Cited by the Examiner

UNITED STATES PATENTS

| 3,167,321 | 1/1965 | Land et al. | 277—92 |
| 3,185,488 | 5/1965 | Christensen et al. | 277—42 |

FOREIGN PATENTS

| 1,037,785 | 8/1958 | Germany. |
| 1,101,071 | 3/1961 | Germany. |

LAVERNE D. GEIGER, *Primary Examiner.*

J. MEDNICK, *Assistant Examiner.*